United States Patent [19]

Lewis

[11] Patent Number: 6,167,511
[45] Date of Patent: Dec. 26, 2000

[54] METHOD TO REFLECT BIOS SET UP CHANGES INTO ACPI MACHINE LANGUAGE

[75] Inventor: Tim Lewis, Fremont, Calif.

[73] Assignee: Phoenix Technologies Ltd., San Jose, Calif.

[21] Appl. No.: 09/094,665

[22] Filed: Jun. 15, 1998

[51] Int. Cl.$^7$ .................................................. G06F 9/445
[52] U.S. Cl. .................. 713/2; 709/221; 710/10
[58] Field of Search .................... 713/1, 2, 100, 713/324; 710/67, 264, 20, 10; 707/67; 709/220, 221, 222

[56] References Cited

U.S. PATENT DOCUMENTS

| | | | |
|---|---|---|---|
| 4,141,068 | 2/1979 | Mager et al. | 364/200 |
| 5,903,894 | 5/1999 | Reneris | 707/100 |
| 5,905,914 | 5/1999 | Sakai et al. | 710/67 |
| 5,919,264 | 7/1999 | Reneris | 713/324 |
| 5,937,200 | 8/1999 | Frid et al. | 710/264 |
| 5,944,831 | 8/1999 | Pate et al. | 713/324 |
| 5,978,912 | 11/1999 | Rakavy et al. | 713/2 |
| 5,999,730 | 6/2000 | Lewis | 717/2 |
| 6,065,067 | 5/2000 | Hobson et al. | 710/8 |
| 6,065,121 | 5/2000 | Hobson et al. | 713/300 |
| 6,081,901 | 6/2000 | Dewa et al. | 713/300 |

OTHER PUBLICATIONS

*Advanced Configuration and Power Interface Specification;* published by Intel Microsoft Toshiba, (revision 1.0a), Jul. 1, 1998, pp. i–xvii, 4–34 to 4–75 and 5–76 to 5–110.

*Primary Examiner*—Thomas C. Lee
*Assistant Examiner*—Rijue Mai
*Attorney, Agent, or Firm*—Foley & Lardner

[57] ABSTRACT

A method and article of manufacture for the run-time modification of Advanced Configuration and Power Management Interface ("ACPI") Machine Language ("AML") code in a Basic Input-Output System ("BIOS") of a computer system having an ACPI compliant BIOS. One aspect includes scanning all the AML code in the BIOS and finding all objects that meet a specified criterion, and modifying the AML that corresponds to the objects found based on the specified criterion. Another aspect includes scanning all the system code in a non-volatile memory of the computer system to determine device options modified by a user's preferences, and modifying the AML to reflect the user's preferences.

24 Claims, 6 Drawing Sheets

METHOD TO REFLECT BIOS SET UP CHANGES INTO ACPI MACHINE LANGUAGE

BACKGROUND OF THE INVENTION

This invention relates generally to the field of configuration and power management for computer systems, and specifically to the run-time modification of an Advanced Configuration and Power Management Interface ("ACPI") Machine Language ("AML") of a computer having an ACPI enabled operating system("OS").

ACPI is a specification jointly developed and released to the public by Microsoft, Intel, and Toshiba. It defines an extensible means by which an Operating System ("OS") can be given greater control over the power management and resource management in future computer systems, such as PCs. ACPI defines a hardware and software interface by which an OS can manipulate the characteristics of motherboard devices. This technology differs from existing Basic Input/Output System ("BIOS") technologies in at least two regards:: (i) the BIOS support code is written in a p-code called ACPI Machine Language ("AML"), discussed further herein, rather than in the native assembly language of a platform; and (ii) the BIOS support code does not determine the policies or time-outs for power or resource management. Rather, these policies are determined by the operating system.

The ACPI hardware interface provides functionality to the OS in two categories (i) control/detection of system control events using a normal interrupt called System Control Interrupt ("SCI"), rather than a System Management Interrupt ("SMI"), and control of the system power state. The details of a platform's support for the hardware interface are provided in a set of well-defined tables within the system BIOS.

The ACPI software interface provides the means for the OS to find the different tables in the system BIOS and means for the OS to understand and control the characteristics of the motherboard devices using AML. The AML resides in the tables within the system BIOS.

ACPI Source Language ("ASL") provides the mechanism by which the OS controls power management, Plug n' Play and docking support under the latest releases of, for example, the Windows and Windows NT operating systems that are required to be ACPI compliant. The ASL is compiled during the BIOS build process into AML. As described above, AML is a pseudo-code assembly language that is interpreted by an OS driver.

AML is the ACPI control method virtual machine language, a machine code for a virtual machine which is supported by an ACPI-compatible OS. ACPI control methods can be written in AML, but programmers ordinarily code the control methods in ASL.

AML is the language processed by the ACPI method interpreter. It is primarily a declarative language and provides a set of declarations that is compiled by the ACPI interpreter into the ACPI name space at definition block load time. AML and ASL are different languages although they are closely related. All ACPI-compatible OS's must support AML. However, a given user can define any arbitrary source language, rather than ASL, together with a conversion tool (a translator) to generate the corresponding AML.

One of the requirements of AML is that its access to memory, I/O, and PCI configuration space are either static or else the capabilities provided for dynamic values are so limited as to be largely useless because they are:

(a) evaluated at the time when the AML is first loaded by the OS; and
(b) are very difficult to modify at that point.

In particular, there are at least two objects where the ability to modify the object's parameters are desirable:

Processor and OperationRegion. In general, OperationRegion (name, type, offset, length) provides the ASL code access to a chunk of memory, I/O space, PCI configuration space, embedded controller space, or SMBus space. However, although "offset" and "length" are expressions, they are only evaluated at the time when the OS loads the ACPI tables and is, therefore, difficult to modify based on changed conditions in the system, such as, when the I/O addresses are relocated by the Motherboard Configurable Devices/Plug and Play routines("MCD/PnP") or the jumper settings on the motherboard.

The ACPI Processor (name, APICID, offset, length) object declares a CPU and its power management control I/O ports to the OS. The "offset" and "length" are not expressions and, therefore, must be located at build time. This is extremely limiting, especially, if it is desired to relocate these I/O addresses using, for example, MCD/PnP.

Another problem arises because, in a system BIOS, users can enter the Setup program to modify the settings of motherboard integrated peripherals. The settings often include, for example, the device's default resource settings (I/O, IRQ, etc.), whether the device is enabled or disabled, and whether the OS is allowed to modify the device's settings at run-time.

In a legacy resource management system, such as PnP, these settings control the information that the run-time services return to the OS. Under ACPI, however, there are certain new problems that make this type of integration more difficult.

1. The OS no longer calls the PnP run-time services.
2. The ASL code (which replaces the PnP run-time calls) cannot access the CMOS to determine the user settings.
3. The OS assumes that if the _DIS (Disable) method exists for a device, calling it will disable the device. However, this can conflict with a user setting that specifies the device as being secured, and hence not changeable by the OS in this manner.
4. The OS assumes that if the _PRS (Possible Resource Settings) object is found under a device, then the device must support multiple configurations even if the users setting indicates otherwise. Therefore, the OS can modify the resource settings in a manner inconsistent with a user's indicated preference using the Setup program.

The following subsections provides an overview of the ACPI architecture that facilitates a better understanding of the present invention which is summarized in the following section titled "Summary of the Invention."

Overview of the ACPI Architecture
1.0 ACPI Specification and the Structure of ACPI The ACPI specification defines the ACPI interfaces including the interface between the OS software, the hardware and the BIOS software. In addition, the specification also defines the semantics of these interfaces.

FIG. 1 is block diagram that defines the software and hardware components relevant to ACPI and how they relate to each other. The ACPI specification describes the interfaces between the components, the contents of the ACPI tables, and the related semantics of the other ACPI components. It is important to note that the ACPI tables are the key feature of an ACPI implementation and the role of an ACPI compliant BIOS is to primarily supply the ACPI tables rather than an Application Programming Interface (API).

FIG. 1 shows the three run-time components of ACPI:

(i) ACPI Tables 30—These tables describe the interfaces to the hardware. These interfaces can take a variety of configurations and include the descriptions in AML code. Some of the descriptions limit what can be built although most descriptions allow the hardware to be built in arbitrary ways, and can also describe arbitrary operation sequences needed to make the hardware function. Since, the ACPI tables can make use of AML which is interpreted, the OS contains an AML interpreter 11 that executes procedures encoded in AML and stored in the ACPI tables 30.

(ii) ACPI Registers 10—These are a limited part of the hardware interface, and are described, at least in location, by the ACPI tables 30.

(iii) ACPI BIOS 20—refers to the part of the firmware that is compatible with the ACPI specifications. Note that the ACPI BIOS 20 is normally not separate from a system BIOS 21 but is shown as a separate component to emphasize its additional functionality and compatibility with the ACPI specifications. Therefore, this ACPI BIOS 20 includes code that boots the machine, as well as implementing interfaces for sleep, wake, and some restart operations.

2.0 ACPI Hardware Specification

ACPI defines a standard mechanism for an ACPI-compatible OS to communicate to an ACPI-compatible hardware platform. This section describes the hardware aspects of ACPI.

ACPI defines "hardware" in terms of a programming model and its behavior. ACPI strives to keep much of the existing legacy programming model the same; however, to meet certain feature goals, designated features conform to a specific addressing and programming scheme (hardware that falls within this category is referred to as "fixed").

ACPI classifies hardware into two categories: fixed or generic. Hardware that falls within the fixed category meets the programming and behavior specifications of ACPI. Hardware that falls within the generic category has a wide degree of flexibility in its implementation.

2.1 Fixed Hardware Programming Model

Because of the changes needed for migrating legacy hardware to the fixed category, ACPI limits features that go into fixed space, as defined by the ACPI specification, by the following criteria:

Performance sensitive features.

Features that drivers require during wakeup.

Features that enable catastrophic failure recovery.

CPU clock control and the power management timer are in the fixed space to reduce the performance impact of accessing this hardware, which will result in more quickly reducing a thermal condition or extending battery life. If this logic were allowed to reside in PCI configuration space, for example, several layers of drivers would be called to access this address space. This takes a long time and will either adversely affect the power of the system (when trying to enter a low power state) or the accuracy of the event (when trying to get a time stamp value).

Access to fixed space by the ACPI driver allows the ACPI driver to control the wakeup process without having to load the entire OS. For example, if a PCI configuration space access is needed, the bus enumerator is loaded with all drivers used by the enumerator. Having this hardware in the fixed space at addresses with which the OS can communicate without any other driver's assistance, allows the ACPI driver to gather information prior to making a decision as to whether it continues loading the entire OS or puts it back to sleep.

When the system has crashed, the ACPI driver can only access address spaces that need no driver support. In such a situation, the ACPI driver will attempt to honor fixed power button requests to transition the system to the global G2.

2.2 Generic Programming Model

Although the fixed programming model requires registers to be defined at specified or "fixed" address locations, the generic programming model allows registers to reside in most address spaces. The ACPI driver directly accesses the fixed feature set registers, but ACPI relies on OEM-provided "pseudo code" (ASL-code) to access generic register space.

ASL code is written by the OEM in the ACPI System Language (ASL) to control generic feature control and event logic. The ASL language enables a number of things:

Abstracts the hardware from the ACPI driver.

Buffers OEM code from the different OS implementations.

ACPI allows the OEM "value added" hardware to remain basically unchanged in an ACPI configuration. One attribute of value-added hardware is that it is all implemented differently. To enable the ACPI driver to execute properly on different types of value-added hardware, ACPI defines higher level "control methods" that is code called to perform an action. The OEM provides ASL code, which is associated with the control methods, to be executed by the ACPI driver. By providing ASL-code, generic hardware can take on almost any form.

ACPI also provides OS independence. To do this the OEM code would have to execute the same under any ACPI-compatible OS. ACPI allows for this by making the AML-code interpreter part of the OS. This allows the OS to take care of synchronizing and blocking issues specific to each particular OS.

The ASL language provides many of the operators found in common object-oriented programming languages, but it has been optimized to enable the description of platform power management and configuration hardware. An ASL compiler converts ASL source code to ACPI Machine Language (AML), which is very compact machine language that the ACPI AML code interpreter executes.

FIG. 2 is a block diagram that represents the generic feature model. In this model the generic feature is described to the ACPI driver 11 through AML code. This description takes the form of an object that sits in ACPI name space associated with the hardware that is adding value to.

3.0 Overview of the System Description Table Architecture

FIG. 3 shows the Root System Description pointer structure 40 and table 41. The Root System Description Pointer structure 40 is located in the system's memory address space and is setup by the BIOS. This structure contains the address of the Root System Description Table ("RSDT") 41, which references other Description Tables that provide data to the OS, supplying it with knowledge of the base system's implementation and configuration.

All description tables start with identical headers. The primary purpose of the description tables is to define for the OS various industry-standard implementation details. Such definitions enable various portions of these implementations to be flexible in hardware requirements and design, yet still provide the OS with the knowledge it needs to control hardware directly.

The RSDT 41 points to other tables in memory. Always the first table, it points to the Fixed ACPI Description table 42 ("FACP"). As shown in FIG. 4, the data within this table includes various fixed-length entries that describe the fixed ACPI features of the hardware. The FACP table 42 always refers to the Differentiated System Description TabLe 43

("DSDT"), which contains information and descriptions for various system features. The relationships between these tables is shown in FIG. 4.

The purpose of the FACP 42 is to define various static system information regarding power management. The Fixed ACPI Description Table 42 starts with the "FACP" signature. The FACP 42 describes the implementation and configuration details of the ACPI hardware registers on the platform.

Besides ACPI Hardware Register implementation information, the FACP 42 also contains a physical pointer to the Differentiated System Description Table 43 ("DSDT"). The DSDT 43 contains a Definition Block named the Differentiated Definition Block 44 for the DSDT 43 that contains implementation and configuration information the OS can use to perform power management, thermal management, or Plug and Play functionality that goes beyond the information described by the ACPI hardware registers.

A Definition Block contains information about hardware implementation details in the form of a hierarchical name space, data, and control methods encoded in AML. The OS "loads" or "unloads" an entire definition block as a logical unit. The Differentiated Definition Block 44 is always loaded by the OS at boot time and cannot be unloaded.

Definition Blocks can either define new system attributes or, in some cases, build on prior definitions. A Definition Block can be loaded from system memory address space. One use of a Definition Block is to describe and distribute platform version changes.

Further details of the ACPI are provided in ACPI Specification Document, Revision 1.0, produced by Microsoft, Intel, and Toshiba, the contents of which are incorporated herein, in its entirety. This document is currently also available on the internet at http://www.teleport.com/~acpi.

SUMMARY OF THE INVENTION

Therefore, it is a general object of the invention to alleviate the problems and shortcomings identified above.

One of the objects of the invention is to provide a method for the run-time modification of AML code in a BIOS of a computer system by scanning all the AML code in the BIOS and finding an object based on a specified criterion so that the AML code corresponding to that object can be modified at run-time.

Another object of the present invention is to provide an article of manufacture usable in a computer that scans all the AML code in the BIOS to find all the objects that meet a specified criterion so that the AML code corresponding to the found objects can be modified at run-time.

Another one of the objects of the invention is provide for the run-time modification of the AML so that all objects that have a specified signature value are scanned and located before calling a register block routine to determine the actual desired address and length of the object.

A further object of the invention is to provide a method and an article of manufacture for the run-time modification of the AML by scanning the system code in a non-volatile memory to find all modifications reflecting a user's preferences and modifying the AML to reflect the user's preferences.

These and other objects are achieved by providing a method for the run-time modification of Advanced Configuration and Power Management Interface ("ACPI") Machine Language ("AML") code in a Basic Input-Output System ("BIOS") of a computer system having an ACPI compliant BIOS, comprising the steps of: scanning all the AML code in the BIOS; finding an object based on a specified criterion; and modifying the AML code corresponding to the object found based on the specified criterion.

One aspect of invention further provides that the step of scanning the AML code, identified above, is performed as a part of a Power on Self Test ("POST") procedure of the BIOS.

Another aspect of the invention provides that the step of modifying the AML code, identified above, includes calling at least one register block routine using the length of the object as an index where the object is either a Processor or an OperationRegion object.

The present invention further provides an article of manufacture usable in a computer having an Advanced Configuration and Power Management Interface ("ACPI") compliant Basic Input-Output System ("BIOS"), the article comprising a a computer readable medium that includes: a first computer readable code means for scanning all ACPI Machine Language ("AML") code in the BIOS and finding an object according to a specified criterion; and a second computer readable code means that modifies the AML code corresponding to the found object based on the specified criterion.

The present invention also provides a method for the run-time modification of ACPI Machine Language ("AML") code in a Basic Input-Output System ("BIOS") of a computer system having an ACPI compliant BIOS. The provided method scans all of the AML code in the BIOS, finds all objects that have a specified signature value in their offset fields, and calls a routine, which uses the length field of each of the found objects as an index, to return the actual desired address and. length of the objects.

The present invention also provides a method. and an article of manufacture for the run-time modification of ACPI Machine Language ("AML") code in a Basic Input-Output System ("BIOS") of a computer system having an ACPI compliant BIOS and a non-volatile memory, in which all the system code in the non-volatile memory is scanned for devices having their options modified by a user's preferences, finding an object, representative of a device, that has options modified by the user's preferences, and modifying the AML code so that the AML code matches the options modified by user's preferences.

Another aspect of the invention is that the user's preferences are indicated by using an operating system's Setup program.

A further aspect of the invention provides that the AML code is modified to match the user's preferences by renaming a Disable (_DIS) method, a Set Current Resources (_SRS) method, and a Possible Resource Settings (_PRS) method.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION OF THE PREFERRED EMBODIMENT(S)

Figure 1:
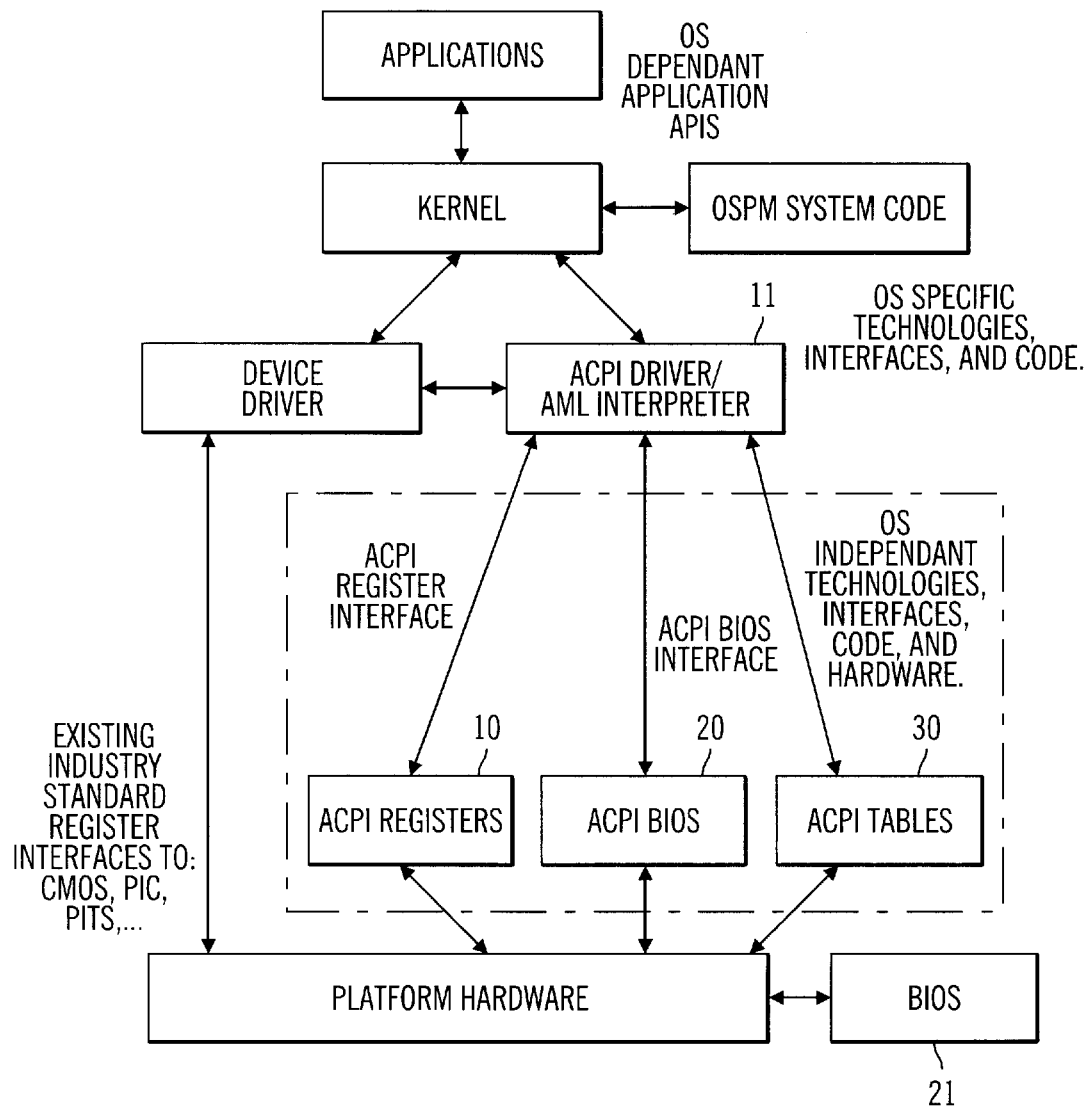
FIG. 1 is block diagram that shows the software and hardware co nents relevant to ACPI.
Figure 2:
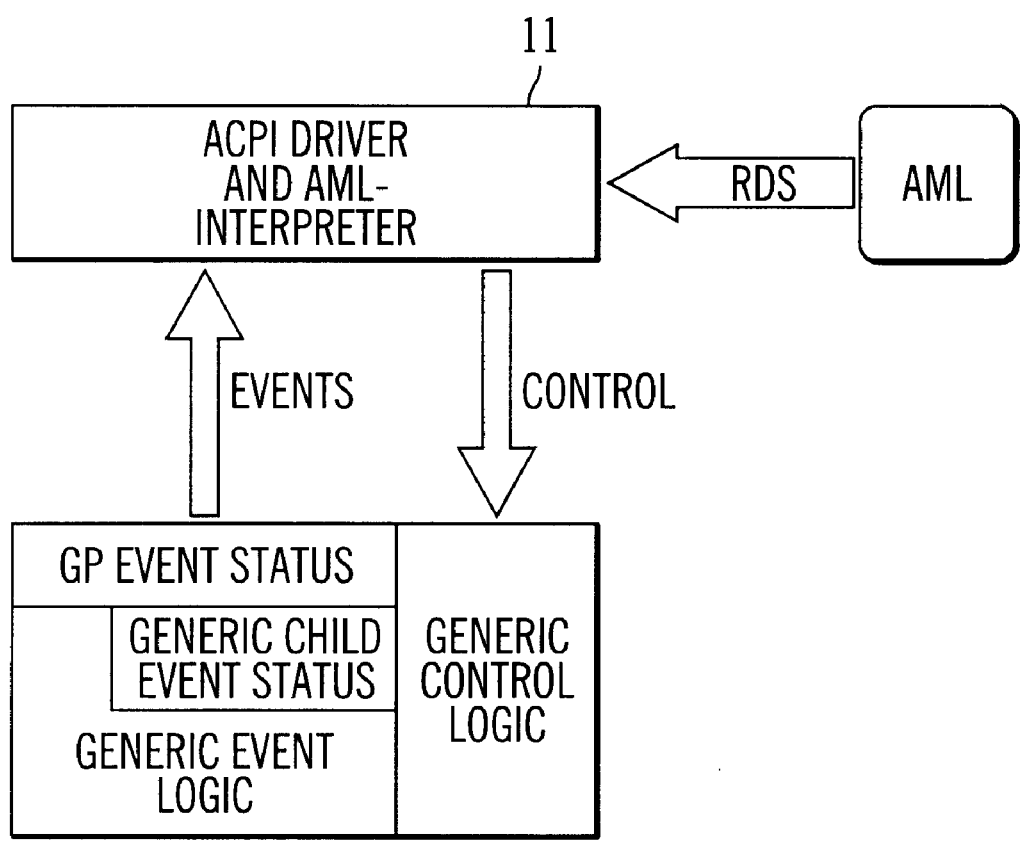
FIG. 2 is a block diagram that represents a generic feature model.
Figure 3:
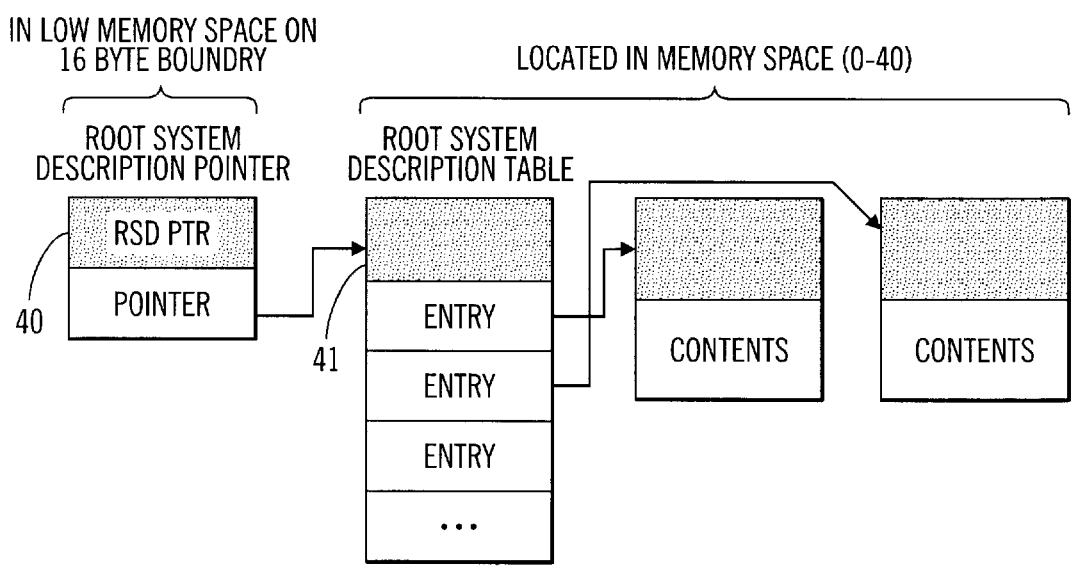
FIG. 3 shows the Root System pointer structure and table.
Figure 4:
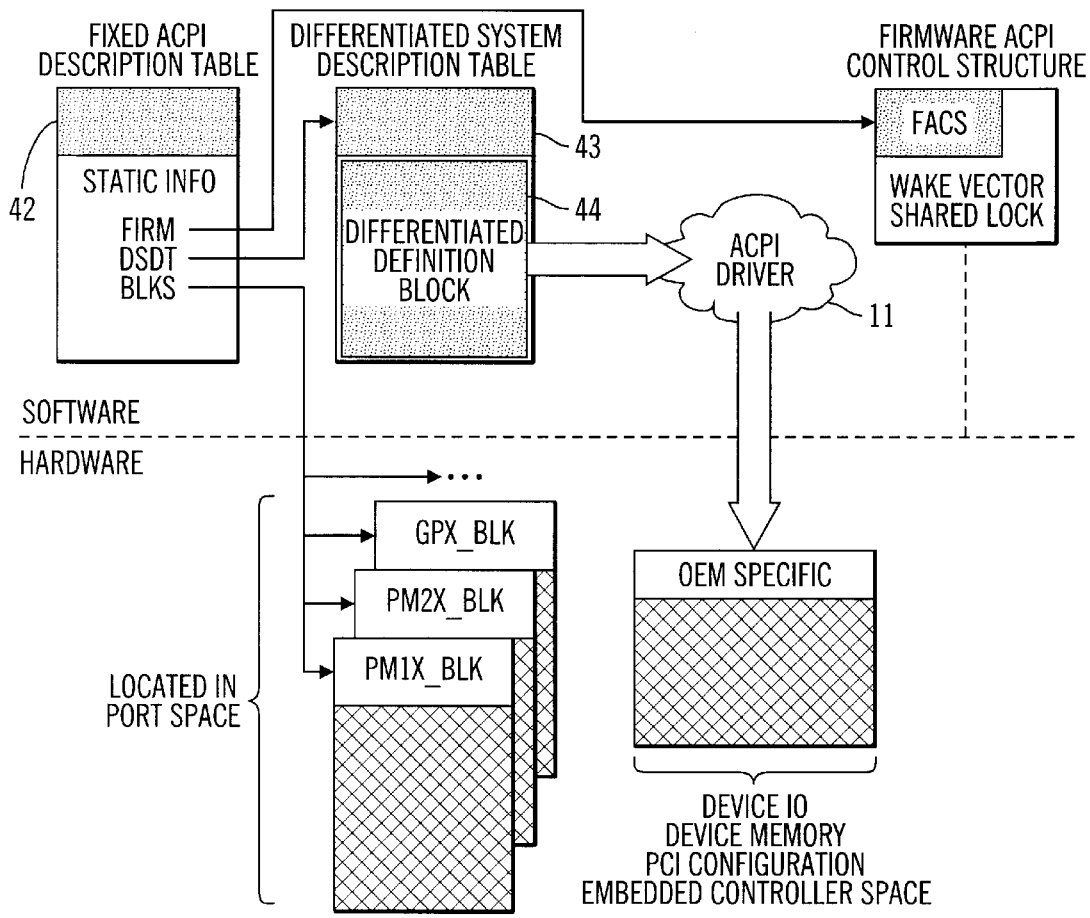
FIG. 4 shows the System Description Table structures.

The present invention provides, in a general aspect, a method and an article of manufacture that provides for the run-time modification of the AML code in a BIOS of a computer system having an ACPI compliant BIOS. The AML code in the BIOS is scanned to find objects that meet a specified criterion. It should be noted that the term "object" refers generally to a programming entity and its corresponding run-time entity that packages data and the procedures that operate on that data.

Thereafter, the AML code corresponding to the objects found based on the specified criterion are modified. In one embodiment, this run-time modification of the AML is performed as part of a Power on Self Test ("POST") procedure of a BIOS.

One preferred embodiment of the present invention relates to the AML processing to relocate register blocks. The core ACPI code supports two types of register blocks: fixed-feature and general-purpose. The fixed-feature register blocks are those that have base addresses and lengths in the Fixed ACPI Description Table 42 ("FACP").

An OEM must provide a FACP to an ACPI compatible OS in the Root System Description Table ("RSDT"). The fixed feature registers are a set of hardware registers in fixed feature register space at specific address locations in system I/O address space. ACPI defines register blocks for fixed features, i.e., each register block gets a separate pointer in the FACP ACPI table 42. Fixed feature events are a set of events that occur at the ACPI interface when a paired set of status and event bits are set at the same time. When a fixed feature event occurs, an SCI is raised. For ACPI fixed feature events, the ACPI driver acts as the event handler.

The FACP 42 contains the ACPI Hardware Register Block implementation details, as well as the physical address of the Differentiated System Description Table 43 ("DSDT") that contains other platform implementation and configuration details. The OS always inserts the name space information defined in the Differentiated Definition Block 44 in the DSDT 43 into the ACPI name space at system boot time, and the OS never removes it.

The processor block, though defined in the ACPI specification, is not a fixed-feature block since it is not defined in the FACP 42. General-purpose register blocks include processor register blocks, GPIO control register blocks or any other I/O addresses which might be relocated by chipset initialization or even motherboard jumper settings.

Register block initialization is handled in two phases. During the first phase, all of the code SDTs (which contain AML code) are searched for an OperationRegion or Processor object with an I/O address of 0xFFFFFFFF (signature value). When such as object is found, the length of the I/O block is used as an input parameter to the register block routines. Therefore, the type of the object, whether it is a Processor Object or an OperationRegion object, is one example of a specified criterion by which AML objects are found during the scanning of the AML code. Similarly, selecting an object with a specific signature value in the offset field is another example of a specified criterion for finding an object when scanning the AML code.

Each of the Register Block routines are called in turn, until one of them returns a non-zero length. That is, if several register block routines could return a non-zero length, the returned value from the first such routine executed is used. If all the register block routines return a length of zero, then the object is left unchanged.

During the second phase, the BIOS calls the Register Block functions for each fixed feature register block. If the returned length is non-zero, then the appropriate entry is modified. Otherwise, it is left unchanged.

Figure 5:
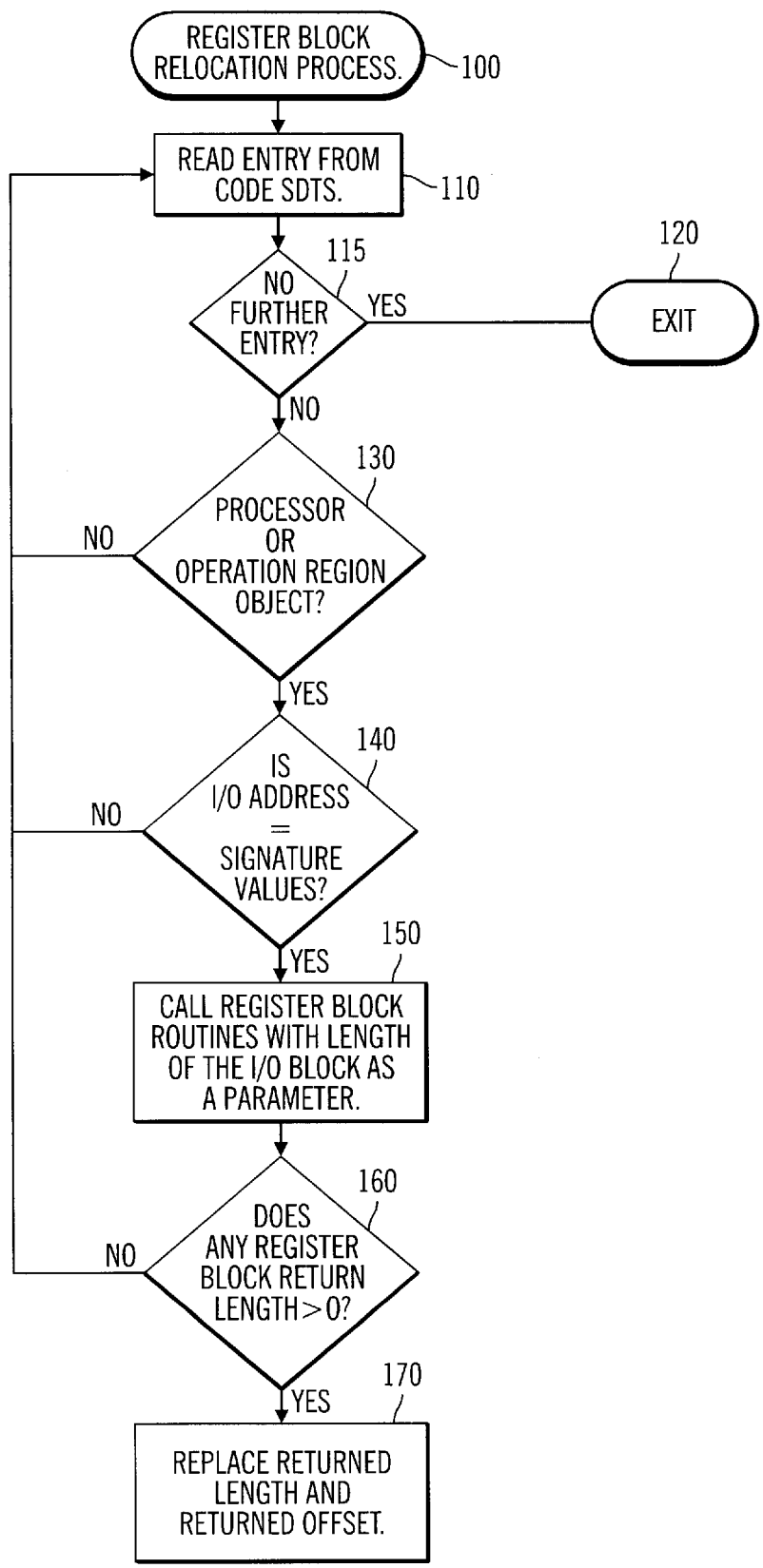
FIG. 5 is a flow diagram that illustrates the steps of one embodiment of the present invention that relocates register blocks.

FIG. 5 is a flow diagram that illustrates the typical steps of register block relocation process 100 which is a part of the register initialization process. The present invention also provides the computer readable code means that implement the steps in the flow diagram of the register block relocation process 100. The actual coding of the steps is within the expertise of one skilled in the computer and system programming arts.

In step 110, the entries from the Code System Description Tables ("SDTs") are read one at a time. If there is no further entry at step 115, the process 100 concludes by exiting at step 120. Otherwise, the process 100 proceeds to step 130 to determine whether the read entry represents either a Processor object or an OperationRegion object. If it is neither a Processor object or a OperationRegion object, the process 100 returns to step 110 to read the next entry from the Code SDT tables. Otherwise, the process 100 proceeds to step 140 to determine whether the I/O address equals a specified signature value.

In step 140, the process 100 determines whether the I/O address equals a specified signature value, and, if not, returns to step 110 to read the next entry from the Code SDT table. The signature value is an arbitrary value to indicate whether the value should be replaced after relocation. A preferred value for the signature value is 0xFFFFFFFF. However, any other suitable value may also be specified. If the I/O address equals the specified signature value, the process 100 proceeds to step 150.

In step 150, the register block routines are called with the length field of the object as a parameter. In addition, the register block routines are typically called with a register block index that determines the type of register block routines called. The types of register block routines called include, for example, chipset or OEM specific hook routines.

In step 160, if none of the register block routines return a non-zero length, the process 100 leaves the object unchanged and returns to step 110 to read the next entry from the Code SDT tables. Otherwise, the process 100 proceeds to step 170 to relocate the object in accordance with the returned I/O address and length. That is, the process 100 replaces the returned length value into the length field of the object and the returned offset value into the offset field of the object. Thereafter, the process 100 proceeds to step 110 to read the next entry from the Code SDT tables.

Another embodiment of the present invention provides that an ACPI compliant BIOS can, optionally, add improved support to the Phoenix Technologies' Plug n' Play ("PnP") solution known as Motherboard Configurable Devices ("MCD"). This improved support is provided in two forms:

(i) During the Power On Self Test ("POST"), modify the AML code so that the device options, either selected during Setup or specified by an Original Equipment Manufacturer ("OEM") at build-time are correctly reflected in the ASL code; or (ii) During Build, a utility, such as Phoenix Technologies' MCD2ACPI, can automatically convert most of the MCD device information from the BIOS ROM image into ASL coce.

The MCD devices refer to devices located on the motherboard that can be configured to a user's preferences by, for example, using an operating system provided Setup program.

According to this embodiment of the present invention, during the POST routines, the BIOS relies upon the AML processing by the ACPI core to find the devices. Thereafter, the user's desired behavior for the device is determined and the AML is modified by either updating the ACPI device object or by renaming the object so that the OS cannot find it at run-time.

One of the ways that MCD devices can be located is by using the fact that they must have a child object name Name(MCD, devicenodenumber).

The device node number can be retrieved by:
1. building the BIOS with all device support installed;
2. running a utility, such as, MCD2ACPI, which generates a file PSERVICE.ASI; and
3. using the identifier from the file PSERVICE.ASI as the device node number. These identifiers are in the form PSM-devicenodename where devicenodename is the name used when installing the logical component.

It should be noted that one skilled in the art could determine other methods for finding the MCD devices and the method described above is a presently preferred embodiment.

Once the devices have been found, the present invention provides that: (i) ACPI status of the devices are updated; and/or (ii) The child methods of the devices are renamed. These are accomplished as follows.

The ACPI status of MCD devices can be updated because each MCD device has a local named object, "_STA," which according to the ACPI specifications reports an object's status. The status communicates information to the OS, such as, if the device is present, consuming resources, is functional, and if it should be shown in the User Interface ("UI"). For MCD objects, the _STA object has a build-time default value of disabled and not present. Therefore, if the MCD device is marked as hidden or not present, the ACPI device should be marked as Not Present. If the MCD device is marked as disabled, the ACPI device should be marked as Disabled. Otherwise, the ACPI device should be marked as Present and Enabled.

The appropriate child methods of the MCD devices can also be renamed to match the users preferences as indicated by, for example, the Setup program options. Each MCD device can be marked as "secured," either at build-time or using the Setup program, which indicates that the device's resources cannot be changed or disabled. Therefore, these devices that are so marked must have their _DIS (Disable) method renamed in order to prevent the OS from disabling the device. Also, devices that are marked as "secured" must have their _SRS (Set Resource Setting) method renamed in order to prevent the OS from moving the device. Finally, devices that are marked as "secured" have their _PRS (Possible Resource Setting) method renamed in order to prevent the OS from finding alternate resource settings.

Figure 6:
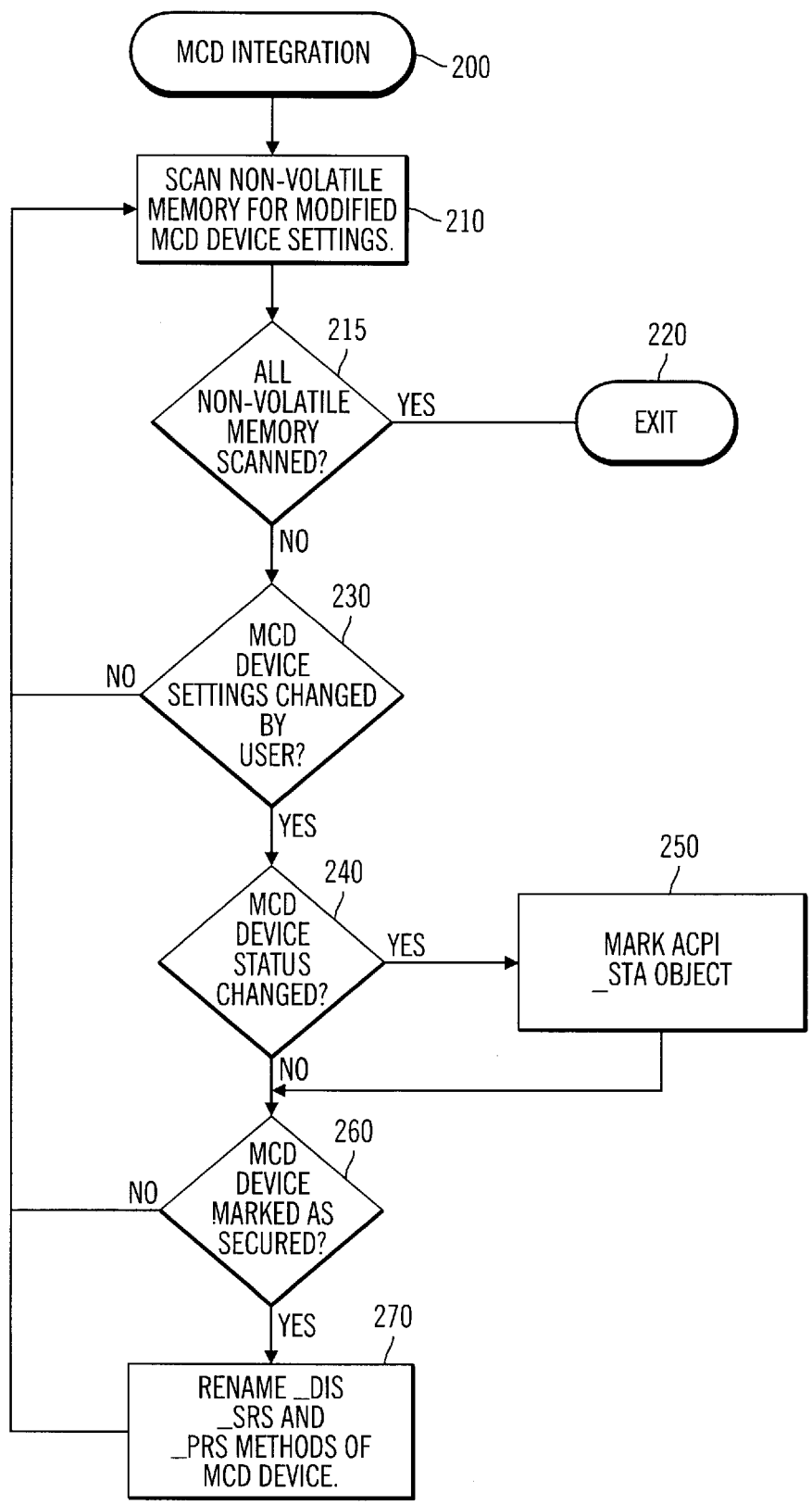
FIG. 6 is a flow diagram that illustrates the steps of another embodiment of the present invention that modifies the AML to automate the integration of the MCD devices.

FIG. 6 is a flow diagram that shows the steps of a process 200 that integrates MCD devices into ACFI. The present invention also provides the computer readable code means that implement the steps in the flow diagram of the MCD integration process 200. The actual coding of the steps is within the expertise of one skilled in the computer and system programming arts.

In step 210, the process scans the non-volatile memory to determine the next MCD device entry. As described earlier, MCD devices can be located by the fact that they have a child object name that has an "MCD" tag. Thereafter, at step 215 the process 200 checks to determine whether all the non-volatile memory has been scanned and, if so, the process exits at step 220.

If not, the process proceeds to step 230 to determine if the preferred device settings have been changed according to a user's preference by, for example, using the Setup program. The changes by the user using the Setup program are generally stored in non-volatile memory and, therefore, these locations are scanned to determine any changes. If the preferred device settings or options have not been changed, the process 200 returns to step 210 to scan the non-volatile memory to retrieve the next MCD device entry. Otherwise, the process 200 proceeds to step 240 to determine whether the preferred settings include changing the status of the device.

If the step 240 determines that the preferred settings include changing the status of the device, the process 200 proceeds to step 250 to make the appropriate changes to the _STA local object. In this step, the ACPI local object is marked as "Not Present" if the MCD device is marked as hidden or not present. If the MCD device is marked as disabled, the ACPI local object is also marked as "Disabled." Otherwise, the ACPI local object is marked as "Present and Enabled." Thereafter, the process 200 proceeds to step 260 to determine if the MCD device has been marked as "secured."

If the MCD device has been marked as "secured" the process 200 proceeds to step 270 in which the appropriate _DIS method is renamed to prevent the OS from disabling the device. As an example, the _DIS method can be renamed as B_DI. The _SRS method is also renamed to prevent the OS from moving the device. For example, the _SRS method is renamed as B_SR. Finally, the _PRS device is also renamed to prevent the OS from finding alternate resource settings for the device. For example, the _PRS device can be renamed as B_PR.

Other embodiments of the invention will be apparent to those skilled in the art from a consideration of the specification and practice of the invention disclosed herein. It is intended that the specification be considered as exemplary only, with the true scope and spirit of the invention being indicated by the following claims.

What is claimed is:

1. A method for the run-time modification of Advanced Configuration and Power Management Interface ("ACPI") Machine Language ("AML") code in a Basic Input-Output System ("BIOS") of a computer system having an ACPI complaint BIOS, comprising the steps of:

scanning all the AML code in the BIOS;

finding an object in the AML code based on a specified criterion; and modifying the AML code corresponding to the object found based on the specified criterion.

2. A method according to claim 1, wherein the step of scanning the AML code is performed as a part of a Power on Self Test ("POST") procedure of the BIOS.

3. A method according to claim 1, wherein the specified criterion includes having a specified signature value in an offset field of the object.

4. A method according to claim 1, wherein the step of modifying the AML code includes calling at least one register block routine to return the actual desired address and length of the object.

5. A method according to claim 4, wherein the register block routine is called with a length of the object as an index.

6. A method according to claim 1, wherein the step of calling at least one register block routine includes calling a plurality of register block routines.

7. The method according to claim 3, wherein the object is one of a Processor and OperationRegion object.

8. The method according to claim 3, wherein the specified signature value is 0XFFFFFFFF.

9. The method according to claim 4, wherein the register block routine is one of a chipset routine and OEM-platform hook routine.

10. A method for the run-time modification of an Advanced Configuration and Power Management ("ACPI") Machine Language ("AML") code in a Basic Input-Output System ("BIOS") of a computer system having an ACPI complaint BIOS and a non-volatile memory, comprising the steps of:
    scanning all of the AML code in the non-volatile memory looking for devices modified by a user's preferences;
    finding an object in the AML code, representative of a device that has options modified by the user's preferences; and
    modifying the AML code so that the AML code matches the options modified by the user's preferences.

11. The method according to claim 10, wherein the options modified indicate that the device must be secured.

12. The method according to claim 10, wherein the step of modifying the AML code includes updating the status of a local status object (_STA) of the device.

13. The method according to claim 10, wherein the user's preference is indicated using an operating system's Setup program.

14. The method according to claim 10, wherein the device is a Motherboard Configurable Device ("MCD").

15. A method for the run-time modification of an Advanced Configuration and Power Management ("ACPI") Machine Language ("AML") code in a Basic Input-Output System ("BIOS") of a computer system having an ACPI compliant BIOS and a non-volatile memory, comprising the steps of:
    scanning all of the code in the non-volatile memory looking for devices modified by a user's preferences;
    finding an object representative of a device that has options modified by the user's preferences, the options modified indicating that the device must be secured; and
    modifying the AML code by renaming a Disable (_DIS) method, a Set Current Resource Settings (_SRS) method, and a Possible Resource Settings (_PRS) method so that the AML code matches the options modified by the user's preferences.

16. An article of manufacture usable in a computer system having an Advanced Configuration and Power Management Interface ("ACPI") compliant Basic Input-Output System ("BIOS"), the article comprising:
    a computer readable medium having a computer readable program code means embodied therein for causing a run-time modification of ACPI Machine Language ("AML") code in the BIOS in the computer system, the computer readable program code means including
    a first computer readable code means for scanning all the AML code in the BIOS and finding an object in the AML code according to a specified criterion, and
    a second computer readable code means that modifies the AML code corresponding to the found object based on the specified criterion.

17. An article of manufacture according to claim 16, wherein the specified criterion is selected from the group consisting of all objects that have a specified signature value in their offset field.

18. An article of manufacture according to claim 16, wherein the second computer readable code means calls at least one register block routine using a length of the object as an index.

19. An article of manufacture according to claim 16, wherein the object is one of a Processor and OperationRegion object.

20. An article of manufacture usable in a computer system having an Advanced Configuration and Power Management Interface ("ACPI") compliant Basic Input-Output System ("BIOS"), the article comprising:
    a computer readable medium having a computer readable program code means embodied therein for causing a run-time modification of ACPI Machine Language ("AML") code in the BIOS in the computer system, the computer readable program code means including
    a first computer readable code means for scanning all of the AML code in the BIOS and finding an object according to a specified criterion, and
    a second computer readable code means that modifies the AML code corresponding to the found object based on the specified criterion, the second computer readable code means calling at least one register block routine using a length of the object as an index, the register block routine being one of a chipset routine and a OEM-platform hook routine.

21. An article of manufacture usable in a computer system having an Advanced Configuration and Power Management Interface ("ACPI") compliant Basic Input-Output System ("BIOS") and a non-volatile memory, the article comprising:
    a computer readable medium having a computer readable program code means embodied therein for causing a run-time modification of ACPI Machine Language ("AML") code in the BIOS in the computer system, the computer readable program code means including
    a first computer readable code means for scanning all system code in the non-volatile memory looking for devices that have options modified by a user's preferences,
    a second computer readable code means for scanning AML code for finding objects corresponding to the devices that have options modified by the user's preferences, and
    a third computer readable code means that modifies the AML code corresponding to the found objects so that the AML code matches the options modified by the user's preferences.

22. An article of manufacture according to claim 21, wherein options modified by the user's preferences include indicating that the device be secured, and
    wherein the third computer readable code means modifies the AML code by renaming a Disable (_DIS) method, a Set Current Resource Settings (_SRS) method, and a Possible Resource Settings (_PRS) method.

23. An article of manufacture according to claim 21, wherein the third computer readable code means modifies the AML code by updating the status of a local status object (_STA) of the device.

24. An article of manufacture according to claim 21, wherein the user's preferences are indicated using an operating system's Setup program.

* * * * *